C. L. WITSAMAN.
TUBE ROLLING TABLE.
APPLICATION FILED MAR. 10, 1915.
1,194,803.
Patented Aug. 15, 1916.
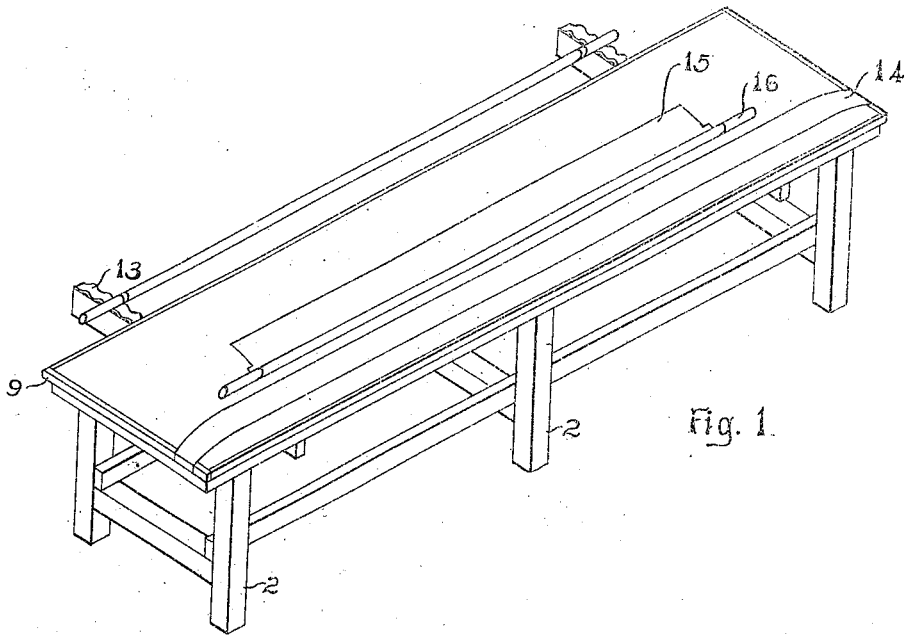
Fig. 1.
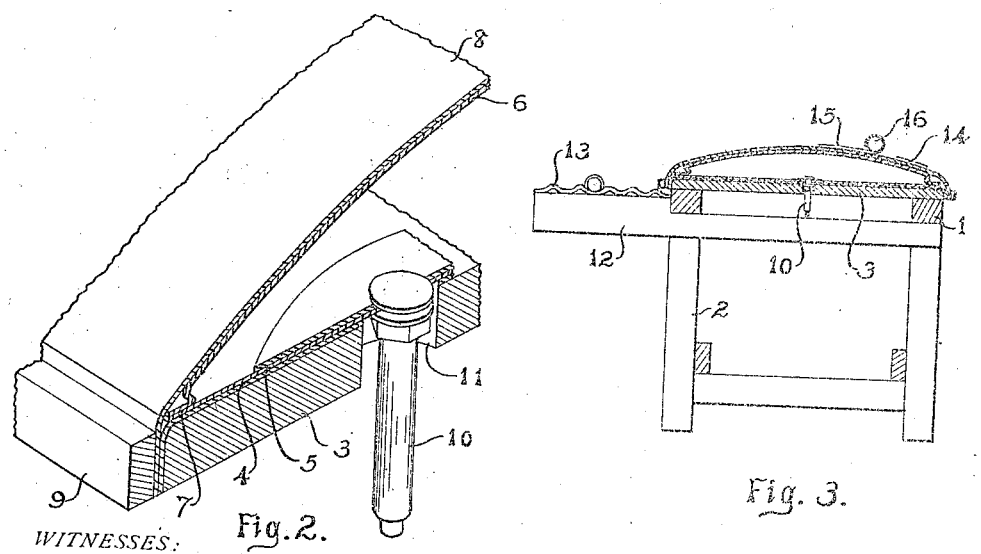
Fig. 2.
Fig. 3.
WITNESSES:
John W. Kittredge
G. L. Ely
INVENTOR.
Clement L. Witsaman.
ATTORNEY

UNITED STATES PATENT OFFICE.

CLEMENT L. WITSAMAN, OF SUMMIT COUNTY, OHIO, ASSIGNOR TO THE FIRESTONE TIRE & RUBBER COMPANY, OF AKRON, OHIO, A CORPORATION OF OHIO.

TUBE-ROLLING TABLE.

1,194,803.

Specification of Letters Patent.

Patented Aug. 15, 1916.

Application filed March 10, 1915. Serial No. 13,488.

*To all whom it may concern:*

Be it known that I, CLEMENT L. WITSAMAN, a citizen of the United States, residing in the county of Summit and State of Ohio, have invented certain new and useful Improvements in Tube-Rolling Tables, of which the following is a specification.

Heretofore the manufacture of inner tubes for pneumatic tires has been a tedious and expensive operation. By the old commonly used method the tube was wrapped over a mandrel and rolled down by a small roller in the hand of the operator. This operation required the workmen to walk back and forth along the whole length of the work bench rolling down the tube, giving the mandrel a slight turn at each trip. It has also been proposed to express the tube from a die in tubular form, and this has been worked out in some instances, but only certain kinds of stock can be used with success in the machine. It has also been proposed to roll up the tube on the mandrel on a padded or rubber-covered surface, but owing to the inequality of the surface which it has been impossible to guard against and to other reasons this has not proved satisfactory.

It is the purpose of my invention to construct a table which can be used in rolling tubes and which gives even and satisfactory results without the employment of highly skilled labor. By the use of my table tubes can be turned out much more quickly and cheaply than by any other method known to me.

In accompanying drawings I have shown a table embodying my invention in which like reference numerals refer to like parts, and in which:

Figure 1 is an isometric view of a table showing a mandrel just as the tube rolling operation is started, and one with a finished tube thereon. Fig. 2 is an enlarged view showing the internal construction of a tube. Fig. 3 is a cross section.

A table consisting of a horizontal frame 1 and legs 2 forms a support for my tube rolling table. This consists of a long flat board, or base 3 which is longer than the mandrel on which the tube is to be rolled. On the upper surface of this base is secured a stout layer of canvas 4 which is brought down around the edges of the base. On the top of the table is placed an oblong rubber bladder, or air bag, composed of a layer of rubber 5 the same size and shape as the upper surface of the board 3, and a second layer of rubber 6 placed over the layer 5 and secured around its edges to the piece 5 by a cemented joint 7. Over this layer 6 is placed a second layer of canvas 8, the edges of which are brought down over the edges of the base. Around the edges of the base is secured a clamping strip 9. The bag is adapted to be inflated by means of an air valve 10 passing through a hole 11 in the board 3.

Across the under side of the table and near the ends are secured transverse pieces 12 which extend to one side of the table and on the upper face of which are secured racks 13 on which the mandrel with the completed tube is adapted to rest until removed for the curing operation.

Lengthwise of the table, opposite the racks 13 and over the upper surface of the canvas cover 8, I secure a strip of cloth 14 which acts as a protection for the top of the table.

In making a tube two operators are usually employed who stand at the front of the table as viewed in Fig. 1. A layer of stock 15 is placed on the table as shown with the edge nearest the operator on the strip 14. One of the operators with a sponge or cloth which has been dipped in some rubber solvent, usually gasolene, moistens the long edges of the stock. The strip 14 serves to protect the upper surface of the table during the operation and can be replaced when soiled. The operators place the mandrel 16 on the lower edge of the stock and press it down until the stock adheres to the mandrel. The mandrel is then rolled up the table with pressure and the stock rolls up around it and forms a tube. The upper edge of the stock sticks to the under ply of the stock making the tube complete. The mandrel with the tube thereon is then rolled over the crown of the table and down on the rack 13 from whence it is removed for the curing process. The table is long enough so that a longitudinal section thereof will show a level portion longer than the tube which is rolled thereon in order that equal pressure may be exerted during the rolling operation. In cross section the table under pressure assumes an even curve. During the rolling the pneumatic table gives an even uniform yielding surface on which it is possible to roll the tube perfectly.

I do not desire to be limited to the exact construction shown on this application, as it is obvious that changes and modifications might be made in the structure without departing from the spirit of the invention or sacrificing any of its benefits.

What I claim is:

1. A table on which inner tubes are rolled comprising a base and an air bag thereon.

2. A table on which inner tubes are rolled comprising a base, an air bag thereon and a cover for said air bag.

3. A table on which raw rubber tubes are rolled comprising a base, a rubber air bag thereon and a canvas cover for said air bag.

4. A table for rolling inner tubes of pneumatic tires comprising a base, an elongated air bag thereon and a canvas cover for said air bag, the longitudinal section of said table when inflated presenting a straight portion long enough to permit the rolling of a tube thereon.

5. A table for rolling inner tubes of pneumatic tires comprising a base, an elongated air bag thereon and a canvas cover for said air bag, the longitudinal section of said table when inflated presenting a straight portion long enough to permit the rolling of a tube thereon and the cross section thereof being curved throughout.

6. In a pneumatic table for rolling inner tubes for pneumatic tires, the combination of a table, a pneumatic tube located upon the table, said tube provided when inflated with a table contact portion and an upper curved portion.

CLEMENT L. WITSAMAN.

Witnesses:
  A. L. ELY,
  J. J. SHEA.